May 6, 1969    RYOICHI ABE    3,443,082
FUNCTION GENERATOR
Filed Nov. 30, 1965    Sheet 1 of 4
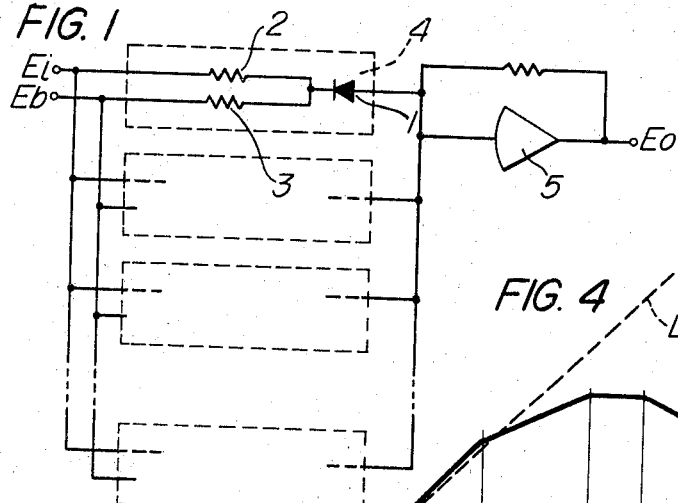
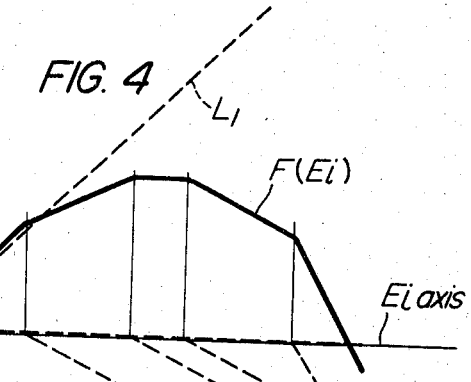
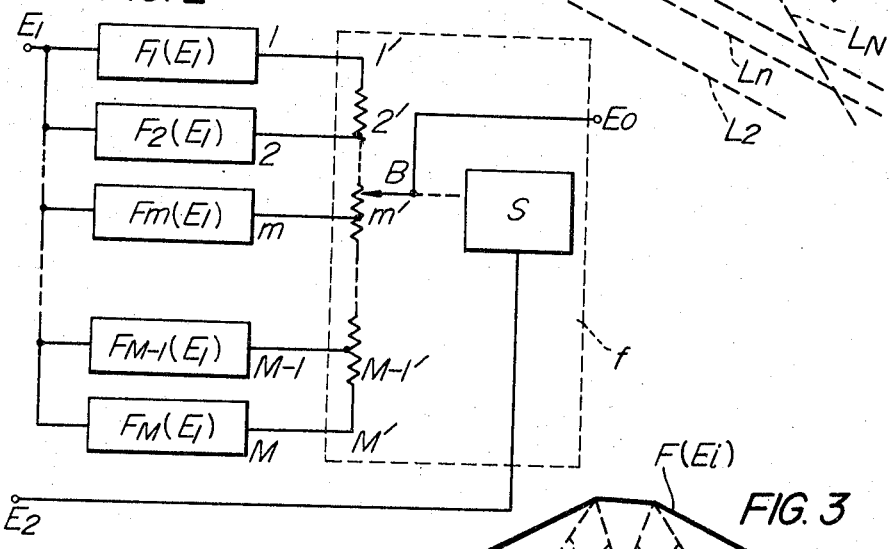
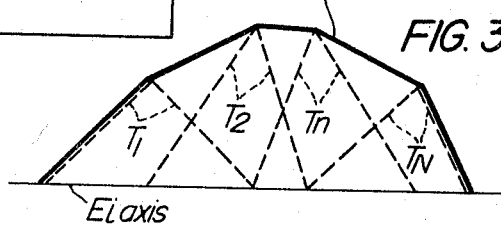
INVENTOR
RYOICHI ABE
BY Paul M. Craig, Jr.
ATTORNEY

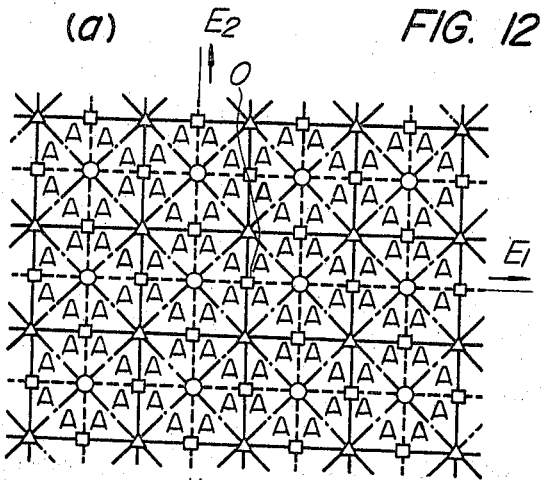
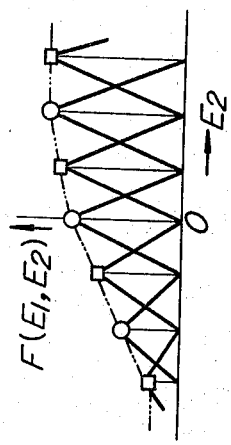
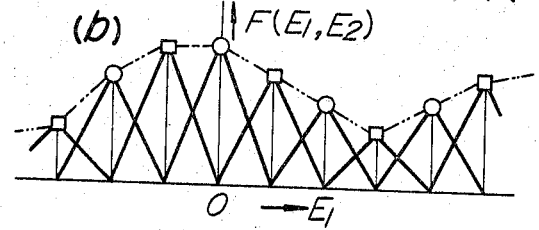
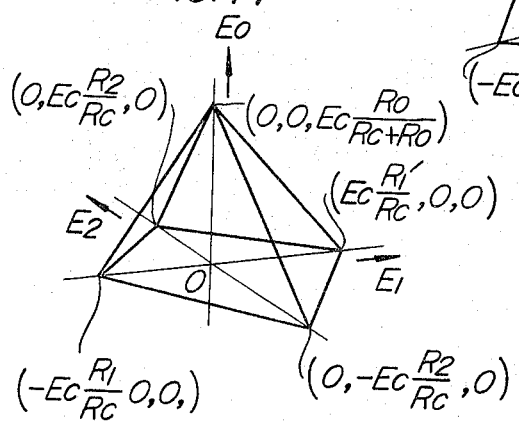
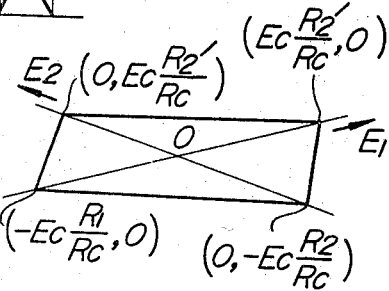
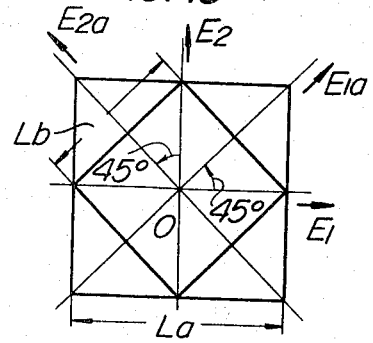

United States Patent Office 3,443,082
Patented May 6, 1969

3,443,082
FUNCTION GENERATOR
Ryoichi Abe, Kodaira-shi, Japan, assignor to Hitachi Electronics Company, Ltd., Tokyo, Japan, a corporation of Japan
Filed Nov. 30, 1965, Ser. No. 510,542
Claims priority, application Japan, Jan. 5, 1965, 40/264
Int. Cl. G06g 7/26, 7/28; G06f 15/34
U.S. Cl. 235—197          6 Claims

ABSTRACT OF THE DISCLOSURE

A function generator for generating as an output voltage a function approximated by lines or surfaces in response to an input voltage, including a plurality of circuits in each of which collectors of two grounded base transistors adapted to be supplied with an input voltage and a bias voltage are connected in common, the said collectors being fed through a resistor with a voltage for operating the transistors, and an output being derived from the said collectors through a diode.

---

The present invention relates to function generators for use in analog computers which generate, as their output voltages, approximate functions of input voltages represented by segmented straight-lines.

The number of input voltages which are independent variables of a function generator is usually one. However, in some cases two independent variables are necessary, as expressed, for example, by a $$E_o = F(E_1, E_2) \qquad (1)$$

where $E_o$ represents an output voltage, and $E_1$ and $E_2$ represent input voltages. Equation 1 is of the form which is obtained by solving, for example, a function defined in 3-dimensional space with respect to one coordinate variable. An example thereof is where, when the latitude and the longitude at a certain point on a map are determined, the height above the sea-level at that point is determined.

The present invention will be described with reference to the attached drawings in which:

FIG. 1 is a connection diagram of a conventional function generator having one independent variable;

FIG. 2 is a connection diagram of a conventional function generator having two independent variables;

FIG. 3 is a diagram explaining how a segmented straight-line approximate function is obtained by adding a plurality of tangled triangular input-output characteristics;

FIG. 4 is a diagram explaining how a segmented straight-line approximate function is obtained by adding a plurality of straight-line characteristics;

Figure 10:
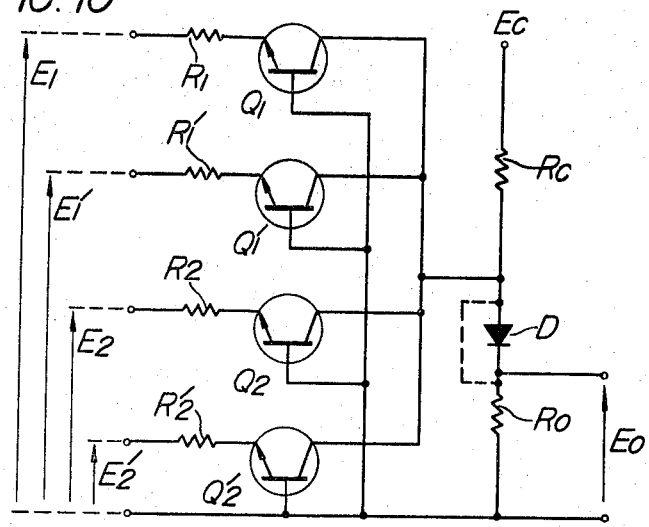
FIG. 10 is a circuit diagram for obtaining quadrangular pyramidal input-output characteristics used in the present invention.
Figure 11:
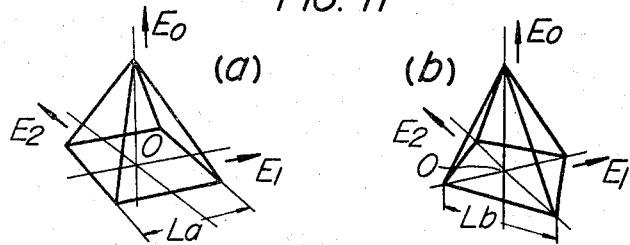

FIGS. 11(a) and 11(b) are diagrams showing a unit quadrangular pyramid for a polyhedral surface approximation of a function having two independent variables;

FIGS. 12(a), (b) and (c) are diagrams showing an example of a polyhedral surface approximation carried out by making use of the quadrangular pyramid of FIG. 11;

FIG. 13 is a diagram showing the coordinates of the vertexes of the base surface of a quadrangular pyramid obtained from the circuit of FIG. 10;

FIG. 14 is a diagram showing the coordinates of the apexes of a quadrangular pyramid obtained from the circuit of FIG. 10; and FIG. 15 is a diagram showing the relation between the coordinates of the base surface of a quadrangular pyramid in the original coordinate system and in a transformed coordinate system.

In the case of one independent variable, which is designated by $E_1$, various electrical circuits generating a function $$E_o = F(E_1) \qquad (2)$$

are known, an example of which is a system for adding segmented straight-lines each having one bend point, the fundamental circuit of which comprises, as shown in FIG. 1, a plurality of limiters 4 each consisting of a diode 1 and resistors 2 and 3, and an operational amplifier 5. $E_1$, $E_b$ and $E_o$ are respectively an input voltage, a bias voltage and an output voltage.

In the case of two independent variables, electronic execution of the arithmetic operation of Equation 1 in analog form is considered to be difficult, and is usually carried out by means of the combination of an electronic circuit and a servo-mechanism as shown in FIG. 2. Fm ($E_1$) ($m$ is one integer from 1 to M) in FIG. 2 is an electronic function generator having an input $E_1$, the output point $m$ of which is connected to the voltage application point $m'$ of a potentiometer for function generation of a servo driven function generator $f$. By position controlling the slider B of the potentiometer by input voltage $E_2$ through the servo mechanism S, the output $F_m$ ($E_1$) of the electronic function generator is made a required final output as it is or in the form that the adjacent two outputs are interpolated, resulting in realization of approximately the relation $$E_o = F(E_1, E_2)$$

This type of function generator has a disadvantage in that the response to the input $E_2$ is slow due to the utilization of the servo mechanism. There is a method in which a function having two or more independent variables is generated by utilizing a voltage comparator or digital technique instead of the servo mechanism. However, this method has disadvantages in that the circuit becomes still more complicated and hence expensive.

An object of the present invention is to provide a novel function generator having one independent variable.

Another object of the present invention is to provide a function generator having two independent variables easily obtainable by modifying the generator having one independent variable.

A function generator having one independent variable will first be described. As one method of generating segmented straight-line approximate functions of one independent variable, there is a method of adding triangular input-output characteristics. This is a method in which the height of each triangle is determined such that the sum triangular input-output characteristics $T_1, T_2, \ldots, T_n, \ldots, T_N$ gives the form of a segmented straight-line function F(E) to be generated, as shown in FIGURE 3, and has a feature that the variation of the height of one triangle exerts no influence on the functional form F(E) being determined by the other triangles.

On the contrary, as shown in FIGURE 4, in a method in which the desired segmented straight-line approximate function F(E) is obtained by adding a group of single bend line $L_n$ (segmented straight lines each consisting of two half-lines and one bend point), the change of the setting of the $n$th segmented straight line causes the slopes of the $(n+1)$th and subsequent segmented lines to change.

Figure 5:
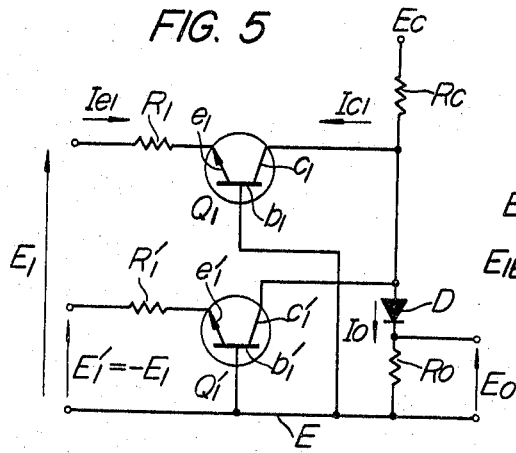
FIG. 5 is a circuit diagram generating triangular input-output characteristics useful in the present invention.

FIG. 5 shows a novel circuit which generates one triangular input-output characteristic. The main part of this circuit consists of a circuit of two grounded base transistors. In FIG. 5 NPN type transistors are shown by way of description. However, the use of PNP type transistors may give rise to similar situations except that the polarities of voltage and current are reversed.

An input signal voltage $E_1$ is applied to the emitter $e_1$ of a transistor $Q_1$ through an input resistor $R_1$. The base $b_1$ of the transistor $Q_1$ is connected with a common potential point E (having zero potential), and the collector $C_1$ of the transistor $Q_1$ is connected with a resistor $R_c$ and the anode of a diode D. The cathode of the diode D is connected with one end of a resistor $R_o$ and the other end of the resistor $R_c$ is connected to the common potential point E (or a point equivalently regarded as common potential, e.g. an addition point of an operational amplifier). On the other hand, another input signal voltage $E_1'$ is applied to the emitter $e_1'$ of a transistor $Q_1'$ through an input resistor $R_1'$.

The base $b_1'$ of the transistor $Q_1'$ is connected to the common potential point E, and the collector $c_1'$ of the transistor $Q_1'$ is connected with the collector $c_1$ of the transistor $Q_1$. To each collector of both transistors is applied a voltage $E_c$ through the resistor $R_c$. Since the transistors used are of NPN type, the emitter currents of both transistors is zero except in the case where both of the input voltages $E_1$ and $E_1'$ are negative. (Strictly speaking, very slight collector current flows. However, this current may be neglected when the kind of the transistors, circuit constants, the signal voltages $E_1$ and $E_1'$ and the voltage $E_c$ are appropriately selected.) Consequently, except for the case where both of the input voltages are negative, the voltage $E_o$ developed between both ends of the resistor $R_o$ and the current $I_o$ flowing through the diode D are given by the following formulas:

$$E_o = \frac{R_o}{R_c + R_o} E_c \tag{3}$$

$$I_o = \frac{1}{R_c + R_o} E_c \tag{4}$$

Now, when one input $E_1$ only is negative, the current $$I_{e1} = \frac{E_1}{R_1} \tag{5}$$

flows into the emitter $e_1$ of the transistor $Q_1$. Actually an input resistor (emitter resistor) $r_e$ of the transistor $Q_1$ is inserted in series with the resistor $R_1$. However, the value of the input resistor $r_e$ is generally small, and hence is neglected here when compared with the resistor $R_1$. In a grounded base circuit as shown in FIG. 5, if the direction of current is taken as shown, the collector current $I_{c1}$ is expressed by $$I_{c1} = h_{FB} I_{e1} \tag{6}$$

where $h_{FB}$ is the D.C. amplification factor of the transistor $Q_1$ in the grounded base circuit, having negative sign, and the absolute value thereof is smaller than 1 but usually very nearly 1. Some transistors have the values of the amplification factors more than 0.99. Since the deviation of $h_{FB}$ among the same kind of transistors is usually very small, the D.C. amplification factor of the transistor $Q_2$ in the grounded base circuit, as will be described later, shall be treated as $h_{FB}$ in this specification.

If the current represented by Formula 6 flows through the collector of the transistor $Q_1$, the following formulas can be obtained from Formulas 5 and 6 and FIG. 5:

$$E_o = \frac{R_o E_c}{R_c + R_o} - \frac{R_o R_c I_{c1}}{R_c + R_o} = \frac{R_o}{R_c + R_o} \left( E_c - \frac{h_{FB} R_c E_1}{R_1} \right) \tag{7}$$

$$I_o = \frac{E_0}{I_0} = \frac{1}{R_c + R_o} \left( E_c - \frac{h_{FB} R_c E_1}{R_1} \right) \tag{8}$$

Since $h_{FB}$ can be regarded as $-1$ with little error, it follows that $$E_0 = \frac{R_0}{R_c + R_o} \left( E_c + \frac{R_c}{R_1} E_1 \right) \tag{9}$$

$$I_0 = \frac{1}{R_c + R_0} \left( E_c + \frac{R_c}{R_1} E_1 \right) \tag{10}$$

It is when the collector voltage is greater than the collector voltage $E_{cm}$ (which usually shows a very small negative value compared with $E_c$) at the time the collector current is saturated that an NPN transistor operates, and hence the bracketed terms of Formulas 9 and 10 can be of negative sign as the case may be. Consequently, if both ends of the diode D have been short-circuited, the output voltage $E_o$ and the output current $I_o$ can take very small negative values. However, in the circuit of FIG. 5, $E_o$ and $I_o$ cannot be of negative values due to the action of the diode D. That is, when $$E_c + \frac{R_c}{R_1} E_1 > 0 \tag{11}$$

$E_o$ and $I_o$ are of the values of Formulas 9 and 10 respectively, and when $$E_c + \frac{R_c}{R_1} E_1 \leq 0 \tag{12}$$

$E_o$ and $I_o$ are zero.

In the above description, the treatment has been made with respect to $E_1$ and $E_1'$ positive value. Even when $E_1$ is made positive, and $E_1'$ is made negative, the same results can be obtained.

Figure 6:
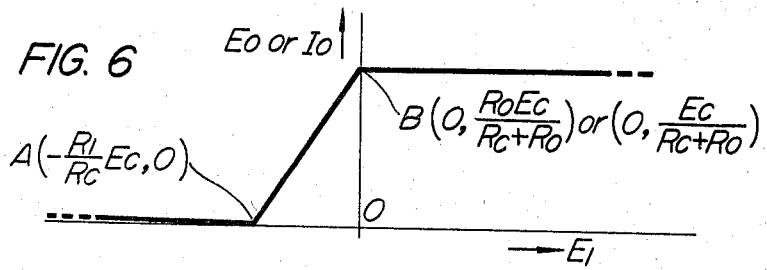
FIG. 6 is a diagram showing the relation between an input and the output corresponding thereto of the circuit of FIG. 5.

The relations between the input voltage $E_1$ and the output voltage $E_o$ and between the input voltage $E_1$ and the output current $I_o$ are shown in FIG. 6. The diagrams of $E_o$ and $I_o$ are lines each having two bend points A and B, and (a) When $$E_1 \leq -\frac{R_1}{R_c} F_c$$

$$E_o = 0 \tag{13}$$

$$I_o = 0 \tag{14}$$

(b) When $$-\frac{R_1}{R_c} E_c < E_1 \leq 0$$

$$E_o = \frac{R_o}{R_c + R_0} \left( E_c + \frac{R_c}{R_1} E_1 \right) \tag{9}$$

$$I_o = \frac{1}{R_c + R_o} \left( E_c + \frac{R_c}{R_1} E_1 \right) \tag{10}$$

(c) When $$E_0 = \frac{R_0 E_c}{R_c + R_0} \tag{15}$$

$$I_0 = \frac{E_c}{R_c + R_o} \tag{16}$$

Formulas (a) to (c) in which $E_1$ is substituted by $E_1'$ represent the relation between $E_1'$ and $E_o$ or between $E_1'$ and $I_o$ when $E_1$ is maintained positive and $E_1'$ is varied between positive and negative. In this case $R_1'$ appears instead of $R_1$. That is, (a') When $$E_1' \leq -\frac{R_1'}{R_c}E_c$$

$$E_o = 0 \quad (13)$$

$$I_o = 0 \quad (14)$$

(b') When $$-\frac{R_1'E_c}{R_c} < E_1' \leq 0$$

$$E_o = \frac{R_o}{R_c+R_o}\left(E_c + \frac{R_c}{R_1'}E_1'\right) \quad (9')$$

$$I_o = \frac{1}{R_c+R_o}\left(E_c + \frac{R_c}{R_1'}E_1'\right) \quad (10')$$

(c') When $$E_1' \geq 0$$

$$E_o = \frac{R_o E_c}{R_c+R_o} \quad (15)$$

$$I_o = \frac{E_c}{R_c+R_o} \quad (16)$$

Now, if two inputs $E_1$ and $$E_1' = -E_1 \quad (17)$$

are applied to the circuit of FIG. 5 as shown, the current flows through the transistor $Q_1$ when $E_1$ is negative, and the current flows through the transistor $Q_1'$ when $E_1$ is positive, that is, when $E_1'$ is negative. Thus putting (a), (b), (c), (a'), (b') and (c') in order with respect to $E_1$, (I) When $$E_1 \leq -\frac{R_1}{R_c}E_c$$

$$E_o = 0 \quad (13)$$

$$I_o = 0 \quad (14)$$

This coincides with the case (a).

(II) When $$-\frac{R_1 E_c}{R_c} < E_1 < 0$$

$$E_o = \frac{R_o}{R_c+R_o}\left(E_c + \frac{R_c}{R_1}E_1\right) \quad (9)$$

$$I_o = \frac{1}{R_c+R_o}\left(E_c + \frac{R_c}{R_1}E_1\right) \quad (10)$$

This coincides with the case (b).

(III) When $$0 < E_1 < \frac{R_1'E_c}{R_c}$$

$$E_o = \frac{R_o}{R_c+R_o}\left(E_c - \frac{R_c}{R_1}E_1\right) \quad (18)$$

$$I_o = \frac{1}{R_c+R_o}\left(E_c - \frac{R_c}{R_1}E_1\right) \quad (19)$$

This is the case (b') into each formula of which the condition (17) has been put.

(IV) When $$\frac{R_1'E_c}{R_c} \geq E_1$$

$$E_o = 0 \quad (13')$$

$$I_o = 0 \quad (14')$$

This is the case (a') into which the condition (10) has been put.

Figure 7:
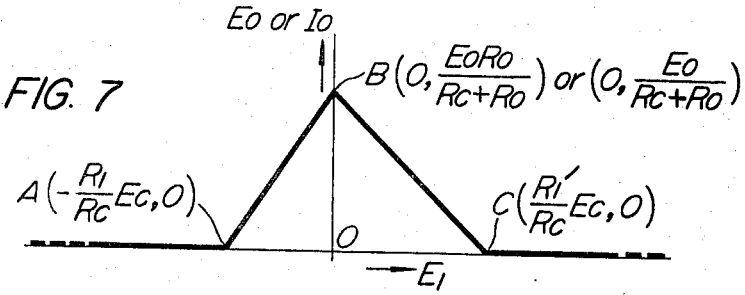
FIG. 7 is a diagram showing the relation between conditional two inputs and the output thereto of the circuit of FIG. 5.

The relations between $E_1$ and $E_o$ and between $E_1$ and $I_o$ are shown in FIG. 7. As shown, if $E_1$ and $-E_1$ are applied to the circuit of FIG. 5 as its two inputs, the output voltage $E_o$ and the output current $I_o$ show a triangular input-output characteristic with respect to $E_1$. If these wave forms are arranged such that, as shown in FIG. 3, each triangle is disposed on the same axis and on the same side, and opposite base vertexes of every two triangles coincide with each other, and the vertex of each triangle is on the perpendicular to the axis at the base vertexes of the adjacent triangles, segmented straight-line approximate function of one independent variable having a feature that each set point (vertex of each triangle) can be set independently of others is obtained.

Figure 8:
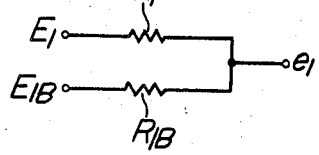
FIG. 8 is an equivalent circuit to a resistor circuit for input to the circuit of FIG. 5.

In order to shift the triangular wave form of FIG. 7 in the direction of $E_1$-axis, it would be well to apply definite voltages, $E_{1B}$ and $-E_{1B}$ respectively, to the emitters of the transistors $Q_1$ and $Q_1'$ through appropriately selected resistors $R_{1B}$ and $R'_{1B}$ different from the input resistors $R_1$ and $R_1'$. The equivalent input voltage $E_{1c}$ and the equivalent resistance $R_{1c}$ of the two resistors $R_1$ and $R_{1B}$ respectively applied by the voltages $E_1$ and $E_{1B}$, as seen from a junction point $e_1$ in the circuit of FIG. 8, are represented respectively by $$E_{1c} = \frac{R_{1B}E_1 + R_1 E_{1B}}{R_1 + R_{1B}} \quad (20)$$

$$R_{1c} = \frac{R_1 R_{1B}}{R_1 + R_{1C}} \quad (21)$$

If the value of Formula 21 is used as an input resistance, $E_{1c}=0$ being an input coordinate of bend point B in FIG.

$$E_1 = \frac{-R_1}{R_{1B}}E_{1B} \quad (22)$$

becomes the input coordinate of the bend point B from Formula 20, and hence, the position of the bend point B can be displaced to any position along the $E_1$-axis by selecting an appropriate value of $R_{1B}$ or $E_{1B}$.

By substituting Formulas 20 and 21 for $E_1$ and $R_1$, respectively, in the E-axis coordinate formula $$E_1 = \frac{-R_1}{R_c}E_c \quad (23)$$

of bend point A, as derived from either Formula 9 or 10, the relation $$\frac{R_{1B}E_1 + R_1 E_{1B}}{R_1 + R_{1B}} = -\frac{E_c R_1 R_{1B}}{R_c(R_1 + R_{1B})} \quad (24)$$

is obtained.

From Formula 24 the new coordinate of $E_1$-axis of the bend point A becomes $$E_1 = -\frac{R_1}{R_c}E_c - \frac{R_1}{R_{1B}}E_{1B} \quad (25)$$

and hence, it can be seen that the $E_1$-axis coordinate of the bend point A is displaced concurrently with the bend point B an equal distance in the same direction along the $E_1$-axis. Also, as to the circuit having the input resistor $R_1'$, the composite voltage $E_{1c}'$ of the two voltages $-E_1$ and $-E_{1B}'$ and the composite resistance $R_{1c}'$ of the two resistances $R_1'$ and $R_{1B}'$ are, using the same procedure as for the above-mentioned circuit having the input resistor $R_1$, $$E_{1c}' = \frac{-R_{1B}E_1 - R_1'E_{1B}'}{R_1 + R_{1B}} \quad (26)$$

$$R_c' = \frac{R_1'R_{1B}'}{R_1' + R_{1B}'} \quad (27)$$

Figure 9:
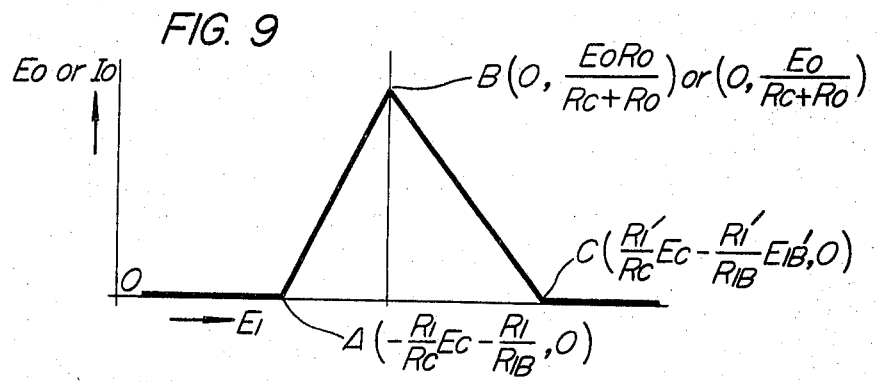
FIG. 9 is a diagram obtained by performing parallel displacement of each bend point along the input axis in FIG. 7.

From these two formulas and the $E_1$-axis coordinate $$E_1 = \frac{R_1'}{R_c}E_c \quad (28)$$

of bend point C, as derived from either Formula 18 or 19, the $E_1$-axis coordinates of bend points B and C of the circuit having the input resistor $R_1'$ are respectively $$E_1 = -\frac{R_1'}{R_{1B}} E_{1B}' \qquad (29)$$

$$E_1 = \frac{R_1}{R_c} E_c - \frac{R_1'}{R_{1B}} E_{1B} \qquad (30)$$

from which it can be seen that both the $E_1$-axis coordinates of the bend points B and C are concurrently displaced an equal distance in the same direction along the $E_1$-axis. If a combination of constants is selected for the four Formulas 22, 23, 29 and 30, so as to satisfy the relation $$\frac{R_1}{R_{1B}} E_{1B} \frac{R_1'}{R_{1B}} E_{1B} \qquad (31)$$

the three bend points A, B and C shift equal distances in the same direction along the $E_1$-axis, as shown in FIG. 9. Thus, the shift of the triangular input-output characteristic along the $E_1$-axis can be effected, in a comparatively simple manner, and therefore, a straight-line segmented approximate function can be easily obtained by adding a plurality of the triangular input-output characteristics.

Hereinbefore the case in which a function of one independent variable, obtained as a compound of the outputs of the unit circuit of FIG. 5, has been described. If the circuit shown in FIG. 10, which is constituted by adding a circuit consisting of two common grounded base transistors each having an emitter connected with an input resistor to the circuit of FIG. 5, and by connecting the collectors of four transistors in total, is used, quadrangular pyramidal input-output characteristics, as shown in FIGS. 11(a) and 11(b), can be generated.

In a similar manner as has been described, where a straight-line segmented approximate function was obtained by the addition of triangles, a function, approximately represented by a succession of triangular planes (hereinafter referred to as polyhedral surface), can be generated by arranging a plurality of quadrangular pyramids on one plane, as schematically shown in FIGS. 12(a), (b) and (c) and by adding these quadrangular pyramidal outputs with reference to each point determined by the $E_1$ and $E_2$ coordinates.

In FIG. 12(a) three groups of quadrangular pyramids are used, which are designated by different symbols.

The first group is a group having the apex designated by a circle and the base surface designated by solid lines. The base surfaces are arranged contiguously and yet without overlap on the same plane.

The second group has the apex designated by a triangle and the base designated by broken lines. Also this group is arranged in the same manner as the first group on the same plane on which the first group is arranged, and such that the orthogonal projection of the apex of the second group coincides with the corner of the base of the first group, and the orthogonal projection of the apex of the first group coincides with the corner of the base of the second group.

The third group has the apex designated by a square and the base designated by chain lines. The orthogonal projection of the apex of the third group coincides with the intersection of the base lines of the first and the second groups, and the corner of the base of the third group coincides with the orthogonal projection of the apex of the first or the second group. Of course, the base of the third group lies on the same plane as the first and the second groups do.

At the position where one of the apexes of the three groups of quadrangular pyramids resides the height of any other quadrangular pyramid is zero. Consequently, when the heights of all pyramids are summed up at any position, the height of any apex itself gives that sum at its own position, and hence the height of each apex can be set independently of other apexes. Since the sum of planes is naturally a plane and the sum of continuous quantities is also a continuous quantity, as shown in FIGS. 12(a), (b) and (c), if the heights of three groups of quadrangular pyramids are summed up at every position, the polyhedral surface composed of contiguously connected unit triangles A, as shown in FIG. 12(a), is obtained. In this case, if the heights of all pyramids are the same, the polyhedral surface becomes a plane. FIG. 12(b) is a cross sectional view of FIG. 12(a) cut by a plane orthogonally intersecting the $E_1$–$E_2$ coordinate plane along the $E_1$-axis. FIG. 12(c) is a similar view as FIG. 12(b) cut along the $E_2$-axis.

In the above-mentioned method of composing quadrangular pyramids, there is no limitation on the size of each quadrangular pyramid and the length of each edge of the base except the condition to satisfy the composing method. Consequently, it is unnecessary that the orthogonal projection of each triangle composing the polyhedral surface be a congruent right triangle as shown in FIG. 12(a). However, due to the restriction to the undermentioned circuit for generating the quadrangular pyramidal outputs, the quadrangular pyramids generated by the function generator according to the present invention belonging to the same group are of the same size and all pyramids become square pyramids. In this case the first and second groups of pyramids, described with reference to FIG. 12(a), are of the same size.

Now, the generation of the input-output characteristics of quadrangular pyramidal shape shown in FIG. 11(b) by the circuit of FIG. 10 will be described.

Input voltages $E_1$, $-E_1$, $E_2$, and $-E_2$ are applied to the emitters of the four transistors $Q_1$, $Q_1'$, $Q_2$ and $Q_2'$ in the circuit of FIG. 10 through input resistors $R_1$, $R_1'$, $R_2$ and $R_2'$ respectively. $E_1$ and $E_2$ are assumed to be independent of each other. In this circuit, the inputs of two transistors of either one of $Q_1$ and $Q_1'$ and either one of $Q_2$ and $Q_2'$ among the four transistors are fed with currents except when $$E_1 = E_2 = 0 \qquad (32)$$

The combinations of the transistors to which the currents are fed are the following four combinations:

(I) $\begin{cases} Q_1 \\ Q_2 \end{cases}$ (When $E_1 < 0$ and $E_2 < 0$)

(II) $\begin{cases} Q_1' \\ Q_2 \end{cases}$ (When $E_1 > 0$ and $E_2 < 0$)

(III) $\begin{cases} Q_1' \\ Q_2' \end{cases}$ (When $E_1 > 0$ and $E_2 > 0$)

(IV) $\begin{cases} Q_1' \\ Q_2 \end{cases}$ (When $E_1 < 0$ and $E_2 > 0$)

Case (I) is equivalent to the circuit of FIG. 5 which comprises two transistors, since the current is not fed to the transistors $Q_1'$ and $Q_2'$.

If such treatment, as applied to the circuit of FIG. 5, is applied to the circuit of FIG. 10, there results $$E_o = \frac{R_o}{R_c + R_o}\left\{E_c + R_c\left(\frac{E_1}{R_1} + \frac{E_2}{R_2}\right)\right\} \qquad (33)$$

$$I_o = \frac{1}{R_c + R_o}\left\{E_c + R_c\left(\frac{E_1}{R_1} + \frac{E_2}{R_2}\right)\right\} \qquad (34)$$

when $$E_c \geq E_c + R_c\left(\frac{E_1}{R_1} + \frac{E_2}{R_2}\right) \geq 0 \qquad (35)$$

and $$E_o = 0 \qquad (36)$$

$$I_o = 0 \qquad (37)$$

when $$E_c + R_c\left(\frac{E_1}{R_1} + \frac{E_2}{R_2}\right) \leq 0 \qquad (38)$$

The equation $$E_o + R_o\left(\frac{E_1}{R_1} + \frac{E_2}{R_2}\right) = 0$$

which constitutes the boundary condition as to whether the value of $E_o$ or $I_o$ is zero or positive, may be transformed into $$\frac{E_1}{-E_o\frac{R_1}{R_o}} + \frac{E_2}{-E_o\frac{R_2}{R_o}} = 1 \qquad (40)$$

Generally the equation $$\frac{x}{A} + \frac{y}{B} = 1 \qquad (41)$$

represents the line intersecting the $x$- and $y$-axes at $(A, O)$ and $(O, B)$ respectively. Therefore, the Equation 40 represents the line passing through the points $$\left(-E_o\frac{R_1}{R_o}\right)$$

and $$\left(-E_o\frac{R_2}{R_o}\right)$$

on the $E_1$- and $E_2$-axes respectively. The ranges of $E_1$ and $E_2$ under consideration, that is, the condition (I); $E_1 < 0$, $E_2 < 0$, correspond to the third quadrant of rectangular coordinate system, and therefore the Equation 39 represents the line segment connecting the point $$\left(-E_o\frac{R_1}{R_o}\right)$$

on the $E_1$-axis and the point $$\left(-E_o\frac{R_2}{R_o}\right)$$

on the $E_2$-axis.

If similar procedures are applied to the other combinations and the conditions bounding the positive and negative values of $E_o$ or $I_o$ are examined, all the cases are summarized as follows:

Case (I): Line segment connecting the point $$\left(-E_o\frac{R_1}{R_o}\right)$$

on the $E_1$-axis and the point $$\left(-E_o\frac{R_2}{R_o}\right)$$

on the $E_2$-axis (third quadrant).

Case (II): Line segment connecting the point $$\left(E_o\frac{R_1'}{R_o}\right)$$

on the $E_1$-axis and the point $$\left(-E_o\frac{R_2}{R_o}\right)$$

on the $E_2$-axis (fourth quadrant).

Case (III): Line segment connecting the point $$\left(E_o\frac{R_1}{R_o}\right)$$

on the $E_1$-axis and the point $$\left(E_o\frac{R_2'}{R_o}\right)$$

on the $E_2$-axis (first quadrant).

Case (IV): Line segment connecting the point $$\left(-E_o\frac{R_1}{R_o}\right)$$

on the $E_1$-axis and the point $$\left(E_o\frac{R_2}{R_o}\right)$$

on the $E_2$-axis (second quadrant).

These results are shown in FIG. 13, from which it can be seen that the base surface of the input characteristics of the circuit of FIG. 10 is quadrangular.

Now turning to the Formulas 33 and 34 which represent the input-output characteristics of case (I), they are transformed into $$\frac{E_1}{E_o - \frac{R_1}{R_o}} + \frac{E_2}{-E_o\frac{R_2}{R_o}} + \frac{E_o}{E_o\frac{E_o}{R_o + R_o}} = 1 \qquad (33')$$

$$\frac{E_1}{-E_o\frac{R_1}{R_o}} + \frac{E_2}{-E_o\frac{R_2}{R_o}} + \frac{I_o}{\frac{E_o}{R_o + R_o}} = 1 \qquad (34')$$

In general, the equation $$\frac{x}{A} + \frac{y}{B} + \frac{z}{C} = 1 \qquad (42)$$

represents the plane, in a three dimentional rectangular coordinate system, intersecting the $x$-, $y$- and $z$-axes at the points A, B, and C on their axes respectively. Therefore, Formula 33' defines the triangle having vertexes lying at the points $$\left(-E_o\frac{R_1}{R_o}\right)$$

$$\left(-E_o\frac{R_2}{R_o}\right)$$

and $$\left(-E_o\frac{R_o}{R_o + R_o}\right)$$

on the $E_1$-, $E_2$-, and $E_o$-axes respectively. The Formula 34' represents the triangle, the vertexes of which are at the points $$\left(-E_o\frac{R_1}{R_o}\right)$$

$$\left(-E_o\frac{R_2}{R_o}\right)$$

and $$\left(E_o\frac{1}{R_o + R_o}\right)$$

on the $E_1$-, $E_2$-, and $I_o$-axes respectively.

Applying similar considerations to the other combinations of $E_1$ and $E_2$, there results the following, as to the input-output characteristics (voltage output):

Case (I): Triangle connecting the point $$\left(-E_o\frac{R_1}{R_o}\right)$$

on the $E_1$-axis, the point $$\left(-E_o\frac{R_2}{R_o}\right)$$

on the $E_2$-axis, and the point $$\left(E_o\frac{R_0}{R_o + R_o}\right)$$

on the $E_o$-axis.

Case (II): Triangle connecting the point $$\left(E_o\frac{R_1'}{R_2}\right)$$

on the $E_1$-axis, the point $$\left(-E_o\frac{R_2}{R_o}\right)$$

on the $E_2$-axis, and the point $$\left(E_c \frac{R_o}{R_c+R_o}\right)$$

on the $E_0$-axis.

Case (III): Triangle connecting the point $$\left(E_c \frac{R_1'}{R_c}\right)$$

on the $E_1$-axis, the point $$\left(E_c \frac{R_2'}{R_c}\right)$$

on the $E_2$-axis, and the point $$\left(E_c \frac{R_o}{R_c+R_o}\right)$$

on the $E_0$-axis.

Case (IV): Triangle connecting the point $$\left(-E_c \frac{R_1}{R_c}\right)$$

on the $E_1$-axis, the point $$\left(E_c \frac{R_2'}{R_c}\right)$$

on the $E_2$-axis, and the point $$\left(E_c \frac{R_o}{R_c+R_o}\right)$$

on the $E_0$-axis.

The $E_0$-axis is a perpendicular at the intersection of the $E_1$- and $E_2$-axes, and coincides with the $I_0$-axis. The substitution of $$"\left(E_c \frac{R_o}{R_c+R_o}\right)$$

on the $E_0$-axis" by $$"\left(\frac{E_c}{R_c+R_o}\right)$$

on the $I_0$-axis" in the above classification gives the current output. The resulting voltage outputs are representatively shown in FIG. 14.

In either case of the voltage output or the current output, each of the above four triangles has two edges in common with two other triangles and one edge in common with the base surface, as shown in FIG. 14. In other words, it can be seen that the input-output characteristics of the circuit of FIG. 10 are quadrangular pyramids in the rectangular coordinate system. This quadrangular pyramid has its apex on the perpendicular at the origin of the two input coordinates. In this case, as the triangular input-output characteristics of the function generating circuit of one independent variable could be shifted along the input coordinate axis, so this quadrangular pyramid can be shifted along the plane defined by the two input coordinates.

In order to obtain the quadrangular pyramidal input-output characteristics, the mid-points of the opposing two edges of the base surface of which are on the $E_1$- and $E_2$-axes respectively, and the apex of which is on the perpendicular at the intersection of the $E_1$- and $E_2$-axes as shown in FIG. 11(a), it may be well that the coordinate axes of FIG. 11(b) are rotated. Taking into consideration the fact that the circiut of FIG. 10 can generate a quadrangular pyramid only for rectangular coordinates, it is sufficient for the quandrangular pyramid of FIG. 11(b) that the edges of the base surface are equal to each other and the angles thereof are also equal to each other in order to rotate the quadrangular pyramid of FIG. 11(b) around the coordinate axis passing through its apex and to bring the mid-points of the opposing two sides of the base surface onto rectangular coordinate axes. In other words, it will do for the unit quadrangular pyramid used in the polyhedral surface approximation method shown in FIG. 12 to be a square pyramid due to the restriction of the circuit of FIG. 10.

In order to rotate the coordinate axes so as to transform the input-output characteristic shown in FIG. 11(b) into that shown in FIG. 11(a), taking into consideration the fact that the input-output characteristic is symmetrical with respect to the $E_0$-axis, the plane defined by the $E_0$- and $E_1$-axes, and the plane defined by the $E_0$- and $E_2$-axes and further that, as seen from FIG. 12, the length of the edge $La$ of the base surface of FIG. 11(a) is twice that $Lb$ of FIG. 11(b), because the angle of rotation is 45° and the input-output characteristic is of a square pyramid, the input voltages $E_{1a}$ and $E_{2a}$ needed to generate the input-output characteristic of FIG. 11(a) should be, from FIG. 15, $$E_{1a}=\frac{E_1+E_2}{\sqrt{2}}, E_{2a}=\frac{E_1-E_2}{\sqrt{2}} \qquad (43)$$

if the input voltages needed to generate that of FIG. 11(b) are put at $E_1$ and $E_2$. The addition and subtraction of the voltages can easily be carried out by making use of an operational amplifier or addition is effected through resistors with the emitters of transistors shown in FIG. 10.

It is self-evident that the parallel displacement of the input-output characteristic of FIG. 11(a) on the $E_1$- and $E_2$- coordinates plane is effected in the same manner as that of FIG. 11(b). Thus far the case wherein a positive output voltage and a positive output current are derived has been described. However, when PNP type transistors are used, a circuit having outputs that are negative can naturally be obtained. Also, even when the same kind of transistors are used, it can be possible to construct a circuit capable of generating positive and negative polarities of outputs by performing the sign change of an output through the use of an operational amplifier and adding an unchanged output thereto.

The coordinates of the maximum output point (apex) of one set of the unit circuit shown in FIG. 10 are, from either of the Formulas 35 and 34

$$E_1=E_2=0 \qquad (44)$$

and the voltage and current outputs thereof are $$E_o=E_c\frac{R_o}{R_c+R_o} \qquad (45)$$

and $$I_o=\frac{E_o}{R_c+R_o} \qquad (46)$$

The setting of these outputs are possible by adjusting the value of the resistor $R_o$. The shape of the formula $$\frac{\overline{E_1}}{E_c\frac{R_1}{R_c}}+\frac{\overline{E_2}}{E_c\frac{R_2}{R_c}}=0 \qquad (47)$$

representing the boundary at which the output voltage $E_o$ becomes zero from a non-zero value and vice versa, remains unaltered even if $R_o$ is varied, and hence the boundary itself remains unaltered. Both $\overline{E_1}$ and $\overline{E_2}$ can have positive or negative sign, and therefore the Formula 47 represents a set of the four formulas of all these signs. Thus, the value of the maximum output point $E_o$ is possible to be set independently of the other independent variables by varying $R_o$.

Incidentally, when only the output current is to be derived, the circuit operates even if the value of the resistor for derivation of output voltage $R_o$ is zero in all hereinabove described circuits. Of course, it is impossible to set the output voltage with the resistor $R_o$ in this case.

In addition, in all examples hereinabove dseribed, it is evident that an input applied to the emitter of each transistor can be that resulted from the resistance addition of a plurality of voltages, in which case, the number of the resistors to be connected to the emitter is plural.

As hereinabove described, according to the present invention, approximate functions are generated with a simple circuit, and in particular for inputs of two variables, functions can be generated purely electronically without utilizing a conventional servo mechanism.

What is claimed is:

1. A function generator for generating an approximate function in response to an input signal, comprising:
   at least one pair of grounded base transistors, the collectors and bases of said transistors being connected in common,
   input means for supplying respective input signals of opposite polarity to the emitters of each of said transistors of a pair including individual first input resistors connected to the emitter of each transistor,
   current source means including a collector resistor connected to said collectors for supplying operating current to said collectors, said operating current being capable of flowing through said transistors depending on the polarities of said input signals, and
   output means including a series connected diode and load resistor connected between said collectors and said bases of said transistors for conduction of said operating current to bypass said transistors.

2. A function generator as defined in claim 1 wherein said input means further comprises at least one bias voltage source including second individual input resistors connected to the emitter of each transistor for supplying bias voltages thereto, the emitters of the transistors of one pair being fed with one bias voltage with polarities opposite to each other.

3. A function generator according to claim 2 wherein only one pair of transistors is provided.

4. A function generator according to claim 2 wherein a second pair of grounded base transistors is provided with the collectors and bases thereof connected respectively to the collectors and bases of said one pair of transistors.

5. A function generator for generating an output representative of a sum of multiple triangle functions including a plurality of generator subcombinations each comprising:
   one pair of grounded base transistors, the collectors and bases of said transistors being connected in common,
   input means for supplying respective input signals of opposite polarity to the emitters of each of said transistors of a pair including individual first input resistors connected to the emitter of each transistor,
   current source means including a collector resistor connected to said collectors for supplying operating current to said collectors, said operating current being capable of flowing through said transistors depending on the polarities of said input signal, and
   output means including a series connected diode and load resistor connected between said collectors and said bases of said transistors for conduction of said operating current to bypass said transistors.

6. A function generator for generating an output representative of a polyhedral function including four generator subcombinations each comprising:
   two pairs of grounded base transistors, the collectors and bases of said transistors being connected in common,
   input means for supplying respective input signals of opposite polarity to the emitters of each of said transistors of a pair including individual first input resistors connected to the emitter of each transistor,
   current source means including a collector resistor connected to said collectors for supplying operating current to said collectors, said operating current being capable of flowing through said transistors depending on the polarities of said input signals, and
   output means including a series connected diode and load resistor connected between said collectors and said bases of said transistors for conduction of said operating current to bypass said transistors.

References Cited

UNITED STATES PATENTS

| | | | |
|---|---|---|---|
| Re. 26,029 | 5/1966 | Nathan | 235—197 |
| 3,100,839 | 8/1963 | Nathan et al. | 235—197 |
| 3,103,583 | 9/1963 | Nathan et al. | 235—197 |
| 3,120,605 | 2/1964 | Nathan et al. | 235—197 |
| 3,244,867 | 4/1966 | Lavin | 235—197 |

MALCOLM A. MORRISON, *Primary Examiner.*

R. W. WEIG, *Assistant Examiner.*

U.S. Cl. X.R.

307—288; 328—158